(No Model.)
R. H. BURNS.
FLUID DISTRIBUTER.
No. 538,008. Patented Apr. 23, 1895.
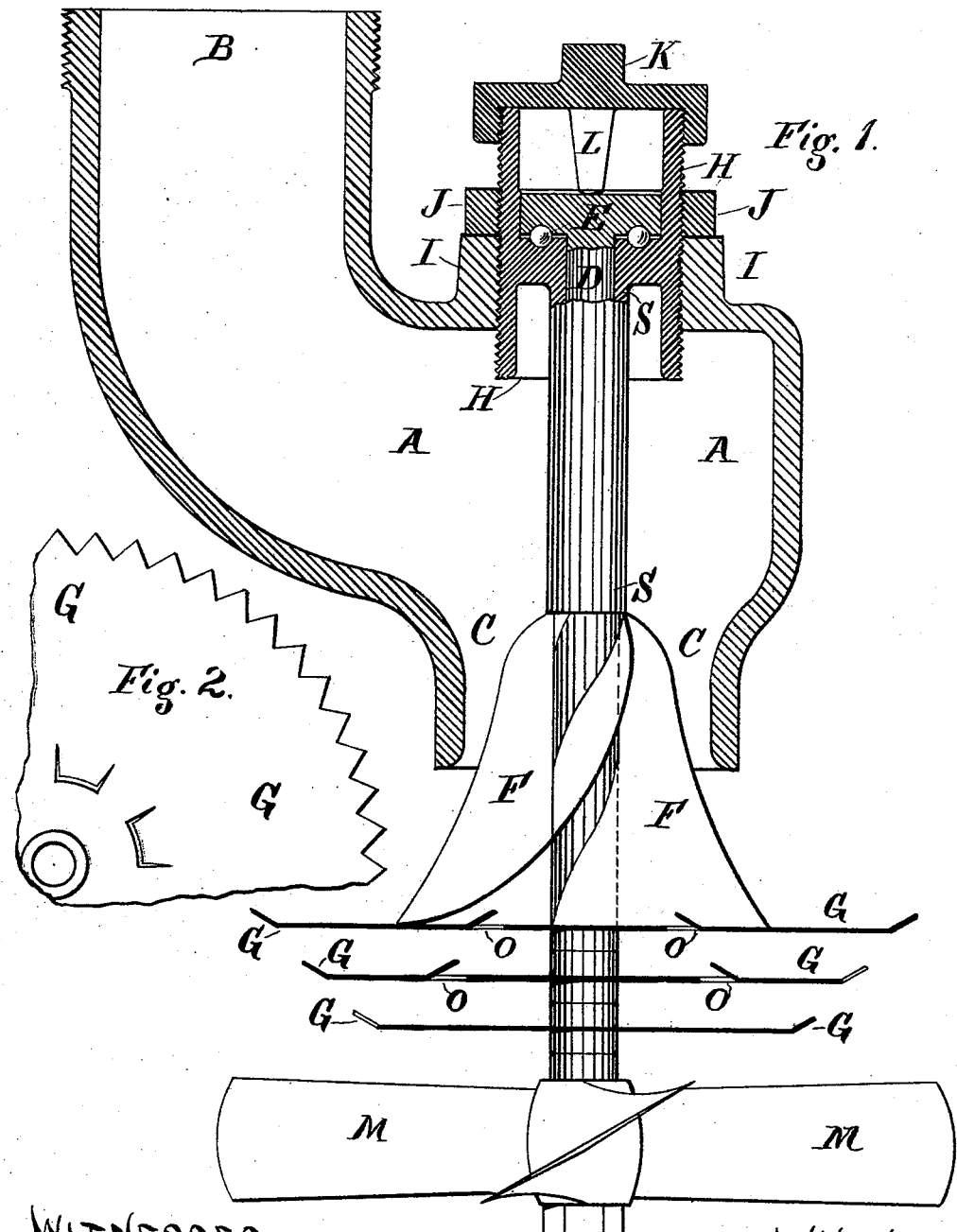
WITNESSES:
O. D. Wright
John W. Krause
INVENTOR:
Robert H. Burns
by Wm. H. Weightman
Atty

UNITED STATES PATENT OFFICE.

ROBERT H. BURNS, OF BROOKLYN, NEW YORK, ASSIGNOR OF ONE-HALF TO JOHN W. KNAUSE, OF NEWARK, NEW JERSEY.

FLUID-DISTRIBUTER.

SPECIFICATION forming part of Letters Patent No. 538,008, dated April 23, 1895.

Application filed August 20, 1894. Serial No. 520,751. (No model.)

*To all whom it may concern:*

Be it known that I, ROBERT H. BURNS, a citizen of the United States, residing in Brooklyn, Kings county, and State of New York, have invented certain new and useful Improvements in Fluid-Distributers, of which the following is a specification, reference being made to the accompanying drawings.

My invention relates to the centrifugal distribution of fluids and has for its special object the cooling of brewers' wort. The wort at such times is not entirely clear of hop leaves and foreign matter and it is essential that there be as little obstruction as possible to its passage through and out of the apparatus.

A special improvement therefore consists in providing the apparatus with an upper individual suspension bearing for the operating wheel and scattering plate, and doing away with the necessity of a lower step or bearing and its supports.

Other improvements consist in the construction, arrangement and combination of the several parts or portions comprising the distributer as may be hereinafter shown and described.

In the drawings Figure 1 represents a sectional view of my invention. Fig. 2 shows a plain view of a portion of a scattering plate provided with perforations.

Similar letters of reference designate like parts or portions in the figures.

The letter A designates a fluid chamber provided with an inlet at B and an outlet at C. The inlet nozzle B, is adapted to be attached to the wort delivery pipe after usual methods.

A spindle D, resting and revolving upon an upper suspension bearing E carries a screw or turbine wheel F, fastened to and adapted to revolve said spindle D. Said screw or turbine wheel F is set to project more or less within and more or less without the outlet nozzle C of chamber A. Beneath the screw or turbine wheel F, are set one or more scattering disks G, which are also fastened to and revolve with spindle D. Beneath the scattering disks G is located a fan-wheel M, also secured to spindle D.

An adjustable bearing carrier H, screws into a boss I at the top of the fluid chamber, and is provided with the jam nut J, and cap K. A projecting lug L is carried down from cap K, to prevent any up and down movement of the spindle upon its suspension bearing E. As a continuation of the adjustable bearing carrier H, a guide sleeve S, is provided, within which the spindle D revolves and is kept plumb.

In the operation of the device the fluid to be cooled is admitted to the fluid chamber at B and passing to and through outlet C impinges upon the screw or turbine wheel F, causing it to revolve at an increased or decreased speed, according to the pressure brought to bear. The disks G and turbine wheel F being attached to the spindle D revolve together and by centrifugal force scatter the fluid into drops and particles bringing about a thorough contact of the same with the atmosphere for cooling purposes. Saw-teeth are preferably cut at the periphery of disks G, as shown in Fig. 2, to assist in the breaking up and scattering of the fluid.

In practice it has been found that a comparatively hot, dense, and moist, cone-shaped mass of air accumulates immediately beneath the disks. To retard such formation and assist as far as possible in the general cooling, a fan-wheel M of sufficient size, is placed to act upon any accumulation of air that may thus occur.

To control the fluid discharge, the adjustable bearing carrier H, supporting the suspension bearing E and spindle D, has an up and down screw adjustment to provide for an in and out movement of the wheel F, and disk G to more or less obstruct the outlet C. No lower bearing, or step is used, thus doing away with all obstruction to the free scattering of the fluid to be cooled, the upper suspension bearing E and spindle sleeve S alone, being made use of to keep the revolving portions steady within outlet C.

To assist in a thorough scattering of the fluid, additional disks G may be made use of. Where more than one disk is used, the upper disk may be dished and holes or openings O, provided as shown in Figs. 1 and 2, to permit of the passage of a portion of the fluid through to the disk below. The bottom disk is of course left closed. These holes are preferably made as shown, being cut on two or more sides and turned up to guide the fluid in the downward direction to the disk below. Beneath such bottom disk, the fan-wheel M, already described is placed for the purpose of removing any accumulation of air, heat or vapor as may occur.

What I claim as new, and desire to secure by Letters Patent, is—

1. In a fluid distributer, in combination with the fluid chamber A, spindle D, resting and revolving upon an upper suspension bearing E, adjustable bearing carrier H; operating turbine F projecting within and without the outlet nozzle C and one or more scattering disks G as and for the purposes set forth.

2. In a fluid distributer, in combination with the fluid chamber A, spindle D, resting and revolving upon an upper suspension bearing E, adjustable bearing carrier H, means for adjusting and holding said bearing carrier H to required position, operating turbine F projecting within and without the outlet nozzle C and one or more scattering disks as and for the purposes set forth.

3. In a fluid distributer, in combination with the fluid chamber A, spindle D, resting and revolving upon an upper suspension bearing E, adjustable bearing carrier H and guide sleeve S, operating turbine F, projecting within and without the outlet nozzle C and one or more scattering disks G as and for the purposes set forth.

4. In a fluid distributer, in combination with the fluid chamber A, spindle D, resting and revolving upon an upper suspension bearing F, adjustable bearing carrier H, guide sleeve S, operating turbine F, projecting within and without the outlet nozzle C, one or more scattering disks G, and a ventilating fan M attached immediately beneath said scattering disks as and for the purposes set forth.

5. In combination with a fluid distributer of the character herein shown and described, two or more scattering disks, the upper ones of which are provided with openings through which the fluid may pass to the one below, as and for the purposes set forth.

ROBERT H. BURNS.

Witnesses:
Wm. H. Weightman,
John W. Knause.